United States Patent
Jameson et al.

(10) Patent No.: US 8,724,690 B1
(45) Date of Patent: May 13, 2014

(54) MULTIPATH DELAY CALCULATOR FOR A DECISION FEEDBACK EQUALIZER

(71) Applicant: L-3 Communications Corp., New York, NY (US)

(72) Inventors: Teren G. Jameson, Salt Lake City, UT (US); Zachary C. Bagley, Salt Lake City, UT (US); Scott C. Smedley, Salt Lake City, UT (US)

(73) Assignee: L-3 Communications Corp., New York, NY (US)

( * ) Notice: Subject to any disclaimer, the term of this patent is extended or adjusted under 35 U.S.C. 154(b) by 0 days.

(21) Appl. No.: 13/658,721

(22) Filed: Oct. 23, 2012

(51) Int. Cl.
*H03H 7/40* (2006.01)

(52) U.S. Cl.
USPC ........... 375/233; 375/229; 375/230; 375/231; 375/232

(58) Field of Classification Search
USPC .......................... 375/233, 229, 230, 231, 232
See application file for complete search history.

(56) References Cited

U.S. PATENT DOCUMENTS

| | | | |
|---|---|---|---|
| 8,457,190 B2 * | 6/2013 | Raghavan et al. | ............ 375/233 |
| 8,467,440 B2 * | 6/2013 | Aziz et al. | ................... 375/233 |
| 2004/0146100 A1 | 7/2004 | Chang et al. | |
| 2005/0111539 A1 | 5/2005 | Tsuchiya | |
| 2005/0175081 A1 | 8/2005 | Zhidkov | |
| 2013/0230093 A1 * | 9/2013 | Aziz et al. | .................... 375/233 |

OTHER PUBLICATIONS

Smalley, "Equalization Concepts: A Tutorial," SPRA 140, Texas Instruments (Oct. 1994), pp. 1-28.

Bagley et al., "Hybrid optical radio frequency airborne communications," Optical Engineering, vol. 51(5) (May 2012), 26 pages.

* cited by examiner

*Primary Examiner* — Dhaval Patel
(74) *Attorney, Agent, or Firm* — Kirton McConkie

(57) ABSTRACT

The present invention is directed to a decision feedback equalizer that implements a multipath delay calculator to determine the delay between a line-of-sight component of a received data signal and a reflection of the line-of-sight component. The determined delay is used to control when decisions are used within the decision feedback equalizer so that the appropriate decisions are delayed until the reflection is received. In this way, the reflection can be substantially removed from the data signal using decisions that were generated when the line-of-sight component was received. Because the correction window is limited to the time when the reflection is received, the number of taps required to perform equalization is greatly reduced resulting in a decision feedback equalizer with less circuitry or logic.

23 Claims, 10 Drawing Sheets

MULTIPATH DELAY CALCULATOR FOR A DECISION FEEDBACK EQUALIZER

BACKGROUND

An equalizer is a device used in digital communications to minimize the effect of intersymbol interference. This signal interference is often caused by multipath reflections. When a signal is transmitted, it can traverse various different paths to arrive at the receiver. The signal traveling over a line of sight (LOS) path is the first to arrive. Other signals may be reflected one or more times prior to arriving at the receiver and therefore, because the reflective path is longer than the LOS path, the reflected signals arrive after the LOS signal.

The interference caused by multipath reflection can generally be accounted for using a forward filter. A forward filter (e.g. a linear feedforward equalizer (LFE)) is often used to minimize the interference caused by previously received bits on a later received bit. A forward filter can be used to account for the interference caused by the reflected signal as long as the delay between the LOS signal and the reflected signal is less then the span of the LFE. In some environments, such as when transmitting over the ocean or flat ground, a strong reflected signal can be received after a substantial delay. In such cases, a forward filter may not be able to account for the interference caused by the strong delayed reflection. In other words, the window in which the forward filter is effective is not wide enough to encompass the reflected signal because of the length of the delay.

In prior approaches, to account for strong reflected signals received after a substantial delay, a decision feedback equalizer (DFE) has often been used. A decision feedback equalizer, as the name suggests, feeds back decisions regarding the effect of intersymbol interference based on the detected values of a received sequence of bits. As such, a decision feedback equalizer can be used to minimize the interference caused by a reflected signal.

FIG. 1 illustrates a typical representation of a DFE using shift registers. As shown, a DFE 100 includes a symbol detector 101, registers 102a-102n, multipliers 103a-103n, and summer 104. In this specification, although the DFEs are represented as comprising registers and multipliers, it is to be understood that any component (whether hardware, software, or both) capable of performing the functionality described could equally be used.

The received signal, which is generally processed first through a forward filter such as an LFE, is periodically sampled by symbol detector 101 to make a decision as to the value of the symbol at each clock cycle (e.g. the voltage level of a bit). A current decision is stored in register 102a while stored decisions in each register 102a-102n are shifted to the right to the next register. In this manner, a sequence of decisions corresponding to the previously received symbols is stored in registers 102a-102n. Also, at each clock, the decisions, also known as cursors, are input to a multiplier (multipliers 103a-103n) where they are each multiplied by a correction factor known as a tap (tap_1-tap_n). The values of the taps are set so that the multiplied values are appropriate to account for the interference that is likely caused by the decision values on a later symbol. Each of the multiplied values is summed together by summer 104 to yield an equalized value. The equalized value is then fed back to summer 105 where it is added to the received signal to account for the interference on the received signal.

As shown, this process requires the DFE to store decisions and maintain taps for the period over which the DFE is used to account for interference. In other words, if the DFE is calculating the intersymbol interference caused by a sequence of 10 received bit on another bit, the detected values for each of the 10 bits must be stored to calculate and account for this effect on the other bit. As can be seen, as the delay of a reflection increases, the number of registers and multipliers required to account for the interference caused by the delayed reflection equally increases. Accordingly, an adequate DFE can often require excessive circuitry or logic for many applications.

SUMMARY

The present invention is directed to a decision feedback equalizer that implements a multipath delay calculator to determine the delay between a line-of-sight component of a received data signal and a reflection of the line-of-sight component. The determined delay is used to control when decisions are used within the decision feedback equalizer so that the appropriate decisions are delayed until the reflection is received. In this way, the reflection can be substantially removed from the data signal using decisions that were generated when the line-of-sight component was received. Because the correction window is limited to the time when the reflection is received, the number of taps required to perform equalization is greatly reduced resulting in a decision feedback equalizer with less circuitry or logic.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF EXEMPLARY EMBODIMENTS

The present invention is directed to a decision feedback equalizer that implements a multipath delay calculator to determine the delay between a line-of-sight component of a received data signal and a reflection of the line-of-sight component. The determined delay is used to control when decisions are used within the decision feedback equalizer so that the appropriate decisions are delayed until the reflection is received. In this way, the reflection can be substantially removed from the data signal using decisions that were generated when the line-of-sight component was received. Because the correction window is limited to the time when the reflection is received, the number of taps required to perform equalization is greatly reduced resulting in a decision feedback equalizer with less circuitry or logic.

This specification describes exemplary embodiments and applications of the invention. The invention, however, is not limited to these exemplary embodiments and applications or to the manner in which the exemplary embodiments and applications operate or are described herein. Moreover, the Figures may show simplified or partial views, and the dimensions of elements in the Figures may be exaggerated or otherwise not in proportion for clarity. In addition, as the terms "on," "attached to," or "coupled to" are used herein, one object (e.g., a material, a layer, a substrate, etc.) can be "on," "attached to," or "coupled to" another object regardless of whether the one object is directly on, attached, or coupled to the other object or there are one or more intervening objects between the one object and the other object. Also, directions (e.g., above, below, top, bottom, side, up, down, under, over, upper, lower, horizontal, vertical, "x," "y," "z," etc.), if provided, are relative and provided solely by way of example and for ease of illustration and discussion and not by way of limitation. In addition, where reference is made to a list of elements (e.g., elements a, b, c), such reference is intended to include any one of the listed elements by itself, any combination of less than all of the listed elements, and/or a combination of all of the listed elements.

In some embodiments of the invention, a decision feedback equalizer can include a multipath delay calculator to determine the delay between a LOS signal and one or more reflected signals. By calculating this delay, less circuitry or logic can be required to account for the effects of interference caused by a reflected signal.

Figure 2:
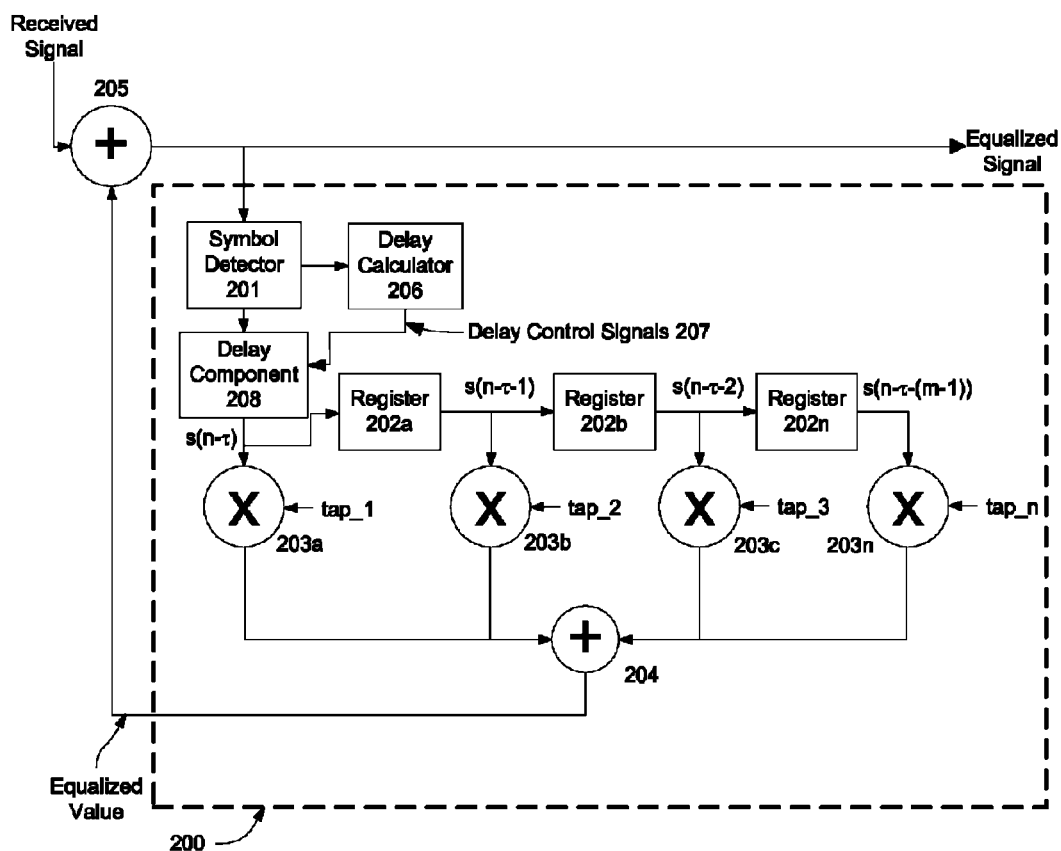
FIG. 2 illustrates an example of a DFE that includes a multipath delay calculator in accordance with one or more embodiments of the invention.

FIG. 2 illustrates an example of a DFE 200 that includes a multipath delay calculator 206 in accordance with one or more embodiments of the invention. Delay calculator 206 is used to determine the delay between the LOS signal and a reflected signal. Once the delay is detected (i.e. once the reflected signal is detected), this delay is applied within the DFE by delay component 208 to limit the duration of time during which equalization is performed on the received signal thus minimizing the amount of circuitry or logic needed. In other words, the window of the signal over which the DFE is applied is shifted and reduced as illustrated in FIG. 3.

Figure 3:
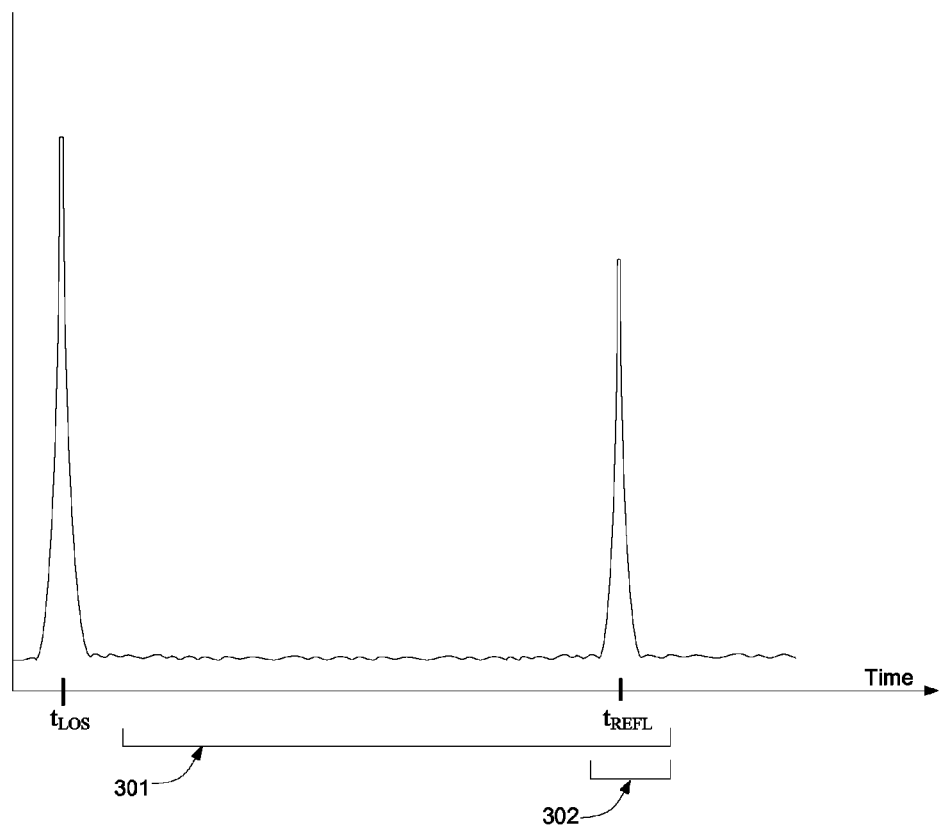
FIG. 3 illustrates a timeline of a received LOS pulse and a reflection of the LOS pulse.
Figure 4:
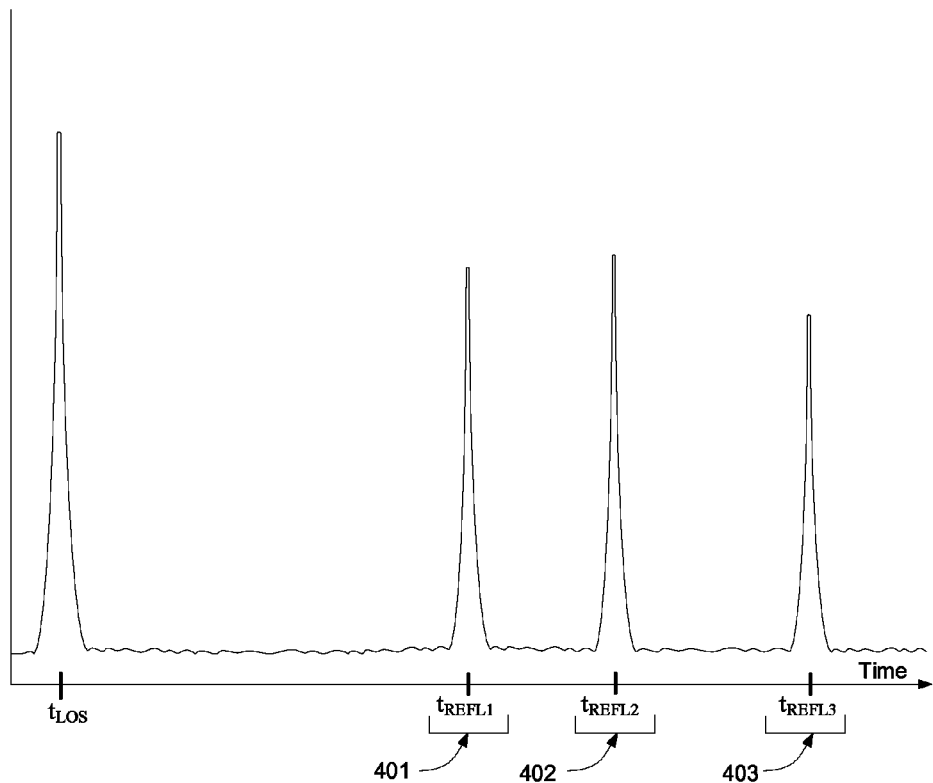
FIG. 4 illustrates an example of multiple reflected signals that can be accounted for using multipath delay calculator.
Figure 5:
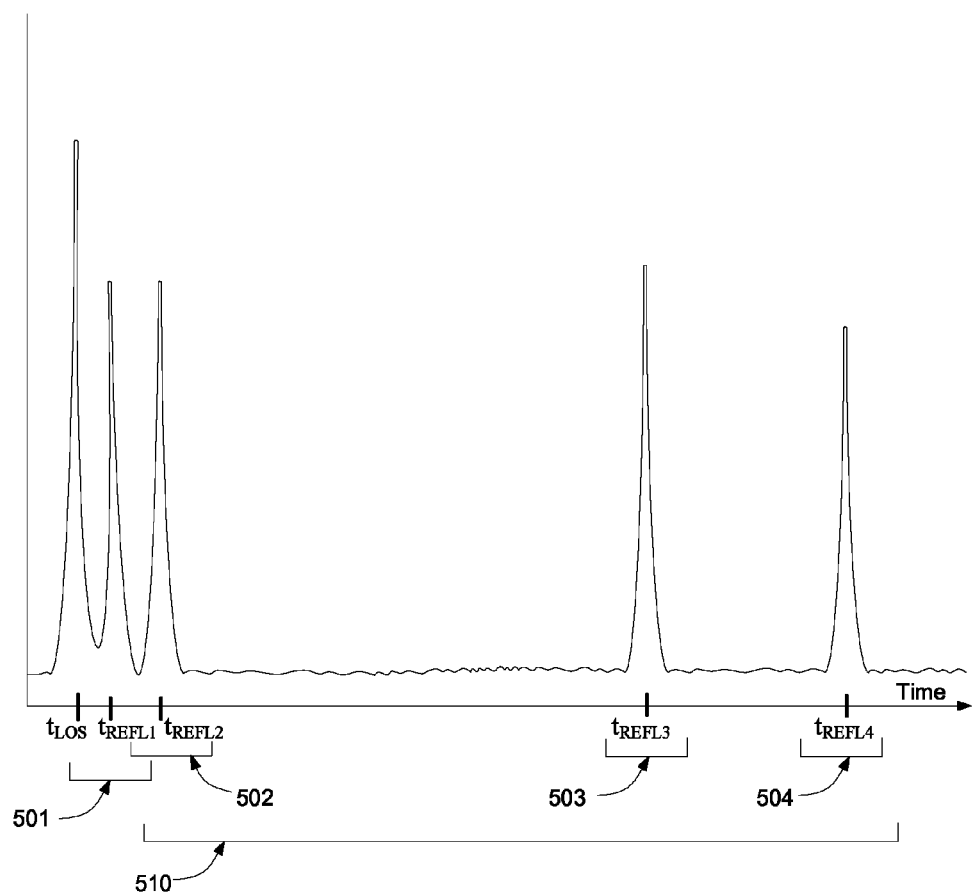
FIG. 5 illustrates a correction window of a traditional DFE.

FIG. 3 provides a timeline of a received LOS pulse 301 and a reflection 302 of the LOS pulse. As shown, the LOS pulse is received at time $t_{LOS}$ while the reflection is received at time $t_{REFL}$. For clarity, it is emphasized that FIGS. 3-5 represents the LOS and reflection signals as pulses rather than continuous signals. In practice, however, the LOS and reflection signals are continuous streams of data. As such, the reflection signal is received at the same time as a later transmitted portion of the LOS signal which results in the interference. A DFE estimates this interference and attempts to remove it from the LOS signal.

Figure 1:
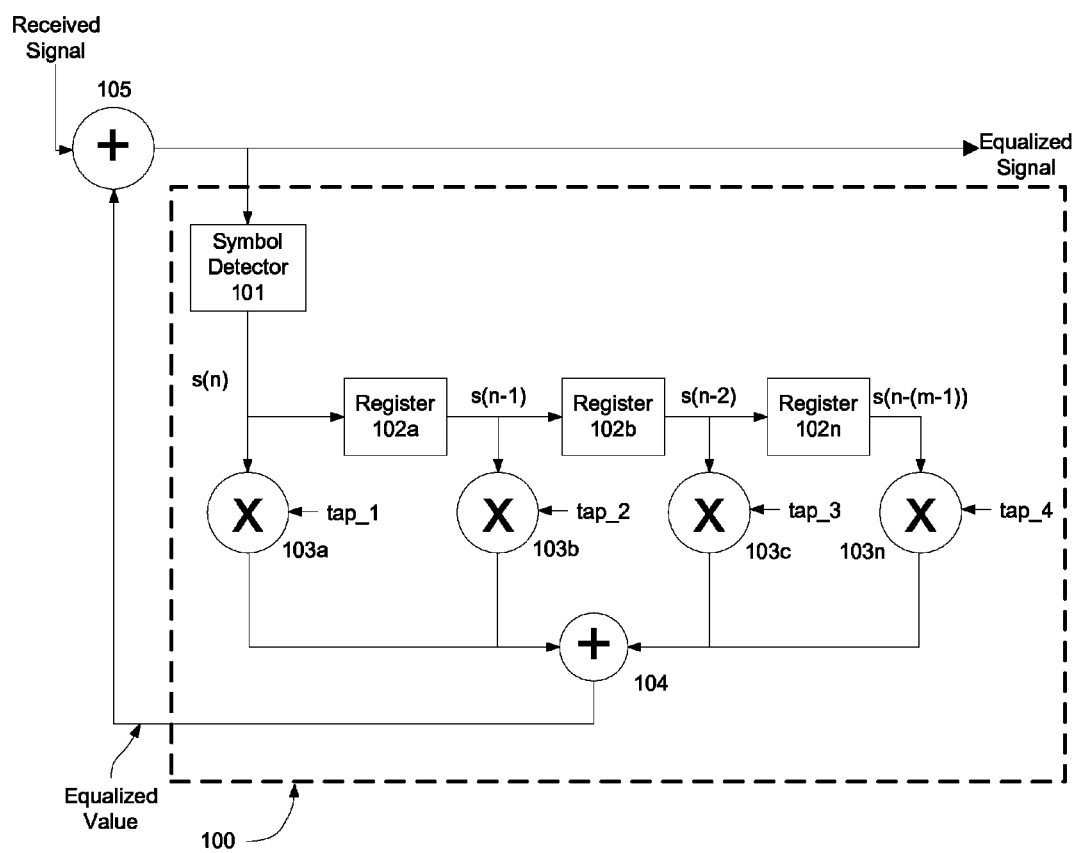
FIG. 1 illustrates a typical representation of a DFE using shift registers.

FIG. 3 also illustrates a correction window for each of two DFEs. Each correction window represents the duration of time (or the number of symbols) that are sampled to generate an equalized value to correct a bit in the received signal. Correction window 301 is representative of a typical DFE such as DFE 100 of FIG. 1, whereas correction window 302 is representative of a DFE employing a multipath delay calculator such as DFE 200 in FIG. 2.

As shown, because a typical DFE does not know when the reflection will occur, in order to account for a reflection, it is required to maintain correction window 311 from the time when the LOS signal is received ($t_{LOS}$) until the strong reflected signal is received ($t_{REFL}$). For each symbol in the received signal within correction window 311, DFE 100 requires a register 102 and a multiplier 103. As the potential difference between $t_{LOS}$ and $t_{REFL}$ increases, correction window 301 must also be widened thus requiring a greater number of registers and multipliers. For example, if the delay between the LOS signal and the reflection was 1 ms and the data rate of the LOS signal was 100 k symbols/s, a DFE having at least 100 registers would be required to account for the intersymbol interference caused by the reflection.

In contrast, as illustrated by correction window 302, when multipath delay calculator 206 is used, because the delay between the LOS and reflected signals can be determined, a narrower correction window can be used thus resulting in less circuitry or logic to implement equalization. Multipath delay calculator 206 can be used to detect when the reflected signal is received and commence correction window 302 at that time via delay control signals 207. In other words, multipath delay calculator 206 identifies $t_{REFL}$ and applies equalization beginning at that time so that correction window 302 is minimized around the portion of the received signal when the reflected signal is also received.

Multipath delay calculator 206 can be used in this manner because, generally speaking, during a substantial portion of the time between $t_{LOS}$ and $t_{REFL}$, the reflection does not cause significant interference to the received signal. Stated another way, because of the large delay in the reflection, its effect is not felt until sometime after the LOS signal is received. Multipath delay calculator 206 is used to determine the time at which the reflection will cause interference, and to then apply appropriate corrections to the received signal at that time to minimize the interference.

In short, multipath delay calculator 206 allows a narrower correction window to be used because the window is being targeted at the particular location in the received signal where equalization is most needed. As will be more fully described below, the DFE is used to generate equalized values similar to how a typical DFE generates equalized values (i.e. by multiplying taps with decisions and summing the multiplied values to produce an equalized value), but the time at which the equalized values are applied back to the received signal is controlled by multipath delay calculator 206 to minimize the required window.

In addition to determining an appropriate window during which to apply feedback from a DFE, multipath delay calculator 206 can also be used to determine multiple windows. Multiple windows may be useful in situations where multiple reflections are present but are spaced in time sufficiently so that a single window does not span all reflections. Multiple windows can also be overlapped to better address interference caused by multiple reflections.

FIG. 4 illustrates an example of multiple reflected signals that can be accounted for using multipath delay calculator 206. As shown, multipath delay calculator 206 can be used to calculate three separate correction windows corresponding to three reflections received at time $t_{REFL1}$, $t_{REFL2}$, and $t_{REFL3}$ respectively. When multiple strong reflections are present as shown, a single window would need to be of sufficient width to span all three reflections. Accordingly, by identifying three separate windows, the circuitry or logic required to implement the DFE can be further reduced.

Multiple windows can also be used to address reflections that occur very soon after the LOS signal is received. For high speed designs when using a DFE, there is an inherent gap between the receipt of the LOS signal and the time in which equalization can be applied to the received signal. Traditional implementations of DFEs cannot account for all effects of a reflection that is received during this gap. FIG. 5 illustrates a correction window 510 of a traditional DFE. As shown, correction window 510 does not commence until after $t_{REFL1}$ when the first reflection is received.

Multipath delay calculator can be used to detect such reflections and can provide a correction window to account for the interference caused by the reflections. As shown in FIG. 5, a correction window 501 can be maintained that spans this gap. In this manner, the reflection at $t_{REFL1}$ can be accounted for using a DFE.

Figure 6:
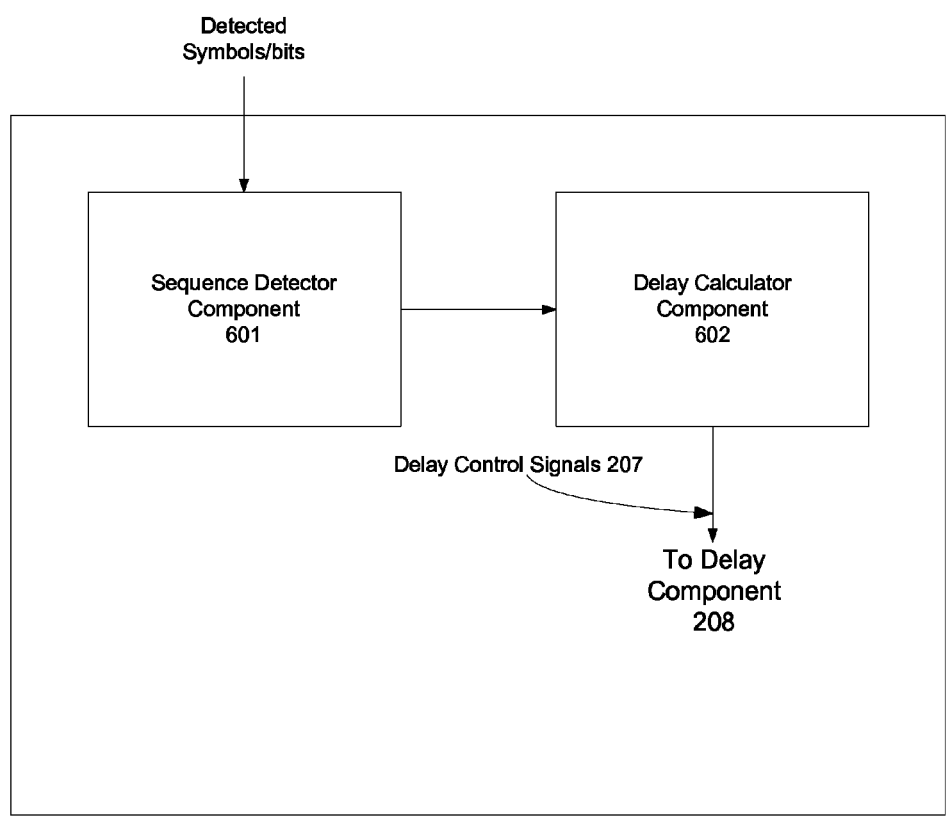
FIG. 6 illustrates components of an exemplary multipath delay calculator.

FIG. 6 illustrates multipath delay calculator 206 in further detail. As shown, multipath delay calculator 206 can include a sequence detector component 601 and delay calculator component 602. Two separate components are shown for clarity, however, it is to be understood that the invention is not limited to any particular component configuration, and that the functionality performed by multipath delay calculator 206 can be implemented in hardware, software, or any combination of hardware and software.

As stated above, symbol detector 201 samples the received signal (after it has been demodulated) and identifies a symbol (or bit) value of the received signal at each clock cycle. Sequence detector component 601 receives the detected symbols from symbol detector 201. Sequence detector component 601 monitors the received sequence of symbols to identify a known pattern. The known pattern can be any pattern known by the receiver to exist in the transmitted signal. In some embodiments, the known pattern can comprise the forward error correction (FEC) sequence used in the transmitted signal. One benefit of using the FEC sequence is that, because an FEC sequence is generally already added to the signal for error correction purposes, no additional overhead needs to be added to the signal to implement the multipath delay calculator according to the present invention.

Sequence detector component 601 uses the known sequence to identify when the LOS signal and any reflections are received. Because the LOS and reflection signals carry the same data (i.e. they are copies of each other), each will also carry the known sequence. Sequence detector component 601 identifies when the LOS signal is received by identifying the known sequence. Sequence detector component 601 then continues to monitor the received signal until it identifies the known sequence again thus indicating that a reflection has been received. As indicated above, multiple strong reflections may be received, and therefore, the known sequence may be identified more than two times.

When sequence detector component 601 identifies a known sequence in a reflection, it can identify the delay between the LOS signal and the reflection. Once this delay is known, delay calculator component 602 can generate delay control signals 207 to control when equalized values are output from the DFE and applied back to the received signal.

Delay control signals 207 cause a delay in the generation of equalized values. For example, as shown in FIG. 2, delay control signals 207 control a delay, τ, that is applied to the decisions that are input into the sequence of registers 203*a*-203*n*. Accordingly, an equalized value is generated from decisions on symbols that were received at some interval, τ, prior to the symbol to which the equalized value is applied as shown in FIG. 7.

Figure 7:
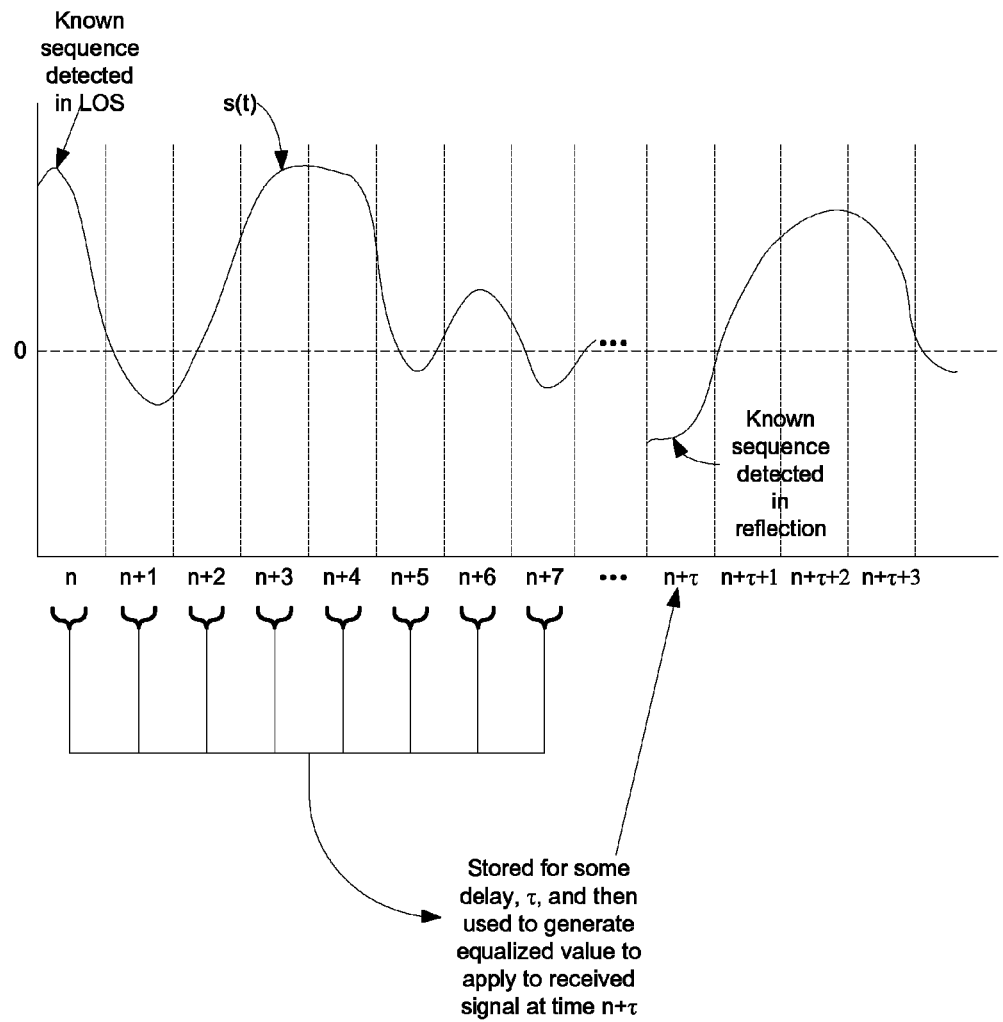
FIG. 7 illustrates an example of applying decisions to correct a later received symbol.

FIG. 7 illustrates a received signal s(t) at time n. The received signal at time n corresponds with a transmitted signal having a sequence of values of 1001111010. Time n represents the time when the LOS signal is detected (or $t_{LOS}$ as shown in FIG. 3-5). Sequence detector component 601 detects the known sequence and notify delay calculator component 602.

Delay component 208 receives decisions from symbol detector 201 and stores the decisions. Unlike a traditional DFE which would immediately pass the decisions through to generate an equalized value, a DFE according to the present invention retains the decisions until the known sequence is again detected indicating that a reflection has been received. At that point, the decisions (corresponding to the time at which the known signal was original received in the LOS signal) are used to output an equalized value that is applied to the received signal at the time that the reflection is received. In essence, this approach is used to remove the reflection from the received signal.

Specifically, delay calculator 206 and delay component 208 are used to delay the time at which equalized values are applied to the received signal. In spite of this delay, the number of decisions being used to generate an equalized value remains the same, and therefore, no additional taps are required to account for the long delay. Specifically, it is still required that delay component 208 store (e.g. in a register) each decision value until it is used, but the number of taps required is reduced because only a portion of the stored decision values are used to generate an equalized value. In this sense, delay component 208 can be viewed as a series of registers for storing decisions that receives delay control signals 207 to control when the decisions are shifted out into registers 202*a*-202*n*. The number of registers 202*a*-202*n* can remain fixed regardless of the delay between the LOS and reflected signals.

Returning to FIG. 7, as s(t) is received and sampled, the decisions can be stored by delay component 208. In this example, eight decisions are shown as being used to generate an equalized value. Accordingly, delay calculator component 602 calculates appropriate delay control signals 207 to ensure that the appropriate eight decisions (as well as taps) are present in registers 203*a*-203*n* at the appropriate time so that an equalized value can be generated from the eight decisions and applied to the received signal at n–τ. These decisions are shifted through registers 203*a*-203*n* appropriately so that the appropriate eight decisions are applied to the received signal at the appropriate time.

The above description assumes that the delay, τ, is fixed. The present invention, however, extends to embodiments where the delay between the LOS signal and the reflection varies. Because the delay can vary, the correction window may need to be adjusted. However, if the window is moved, the decisions in registers 203a-203n will no longer match. For example, if the reflection in FIG. 7 were instead received at time n+τ+3, the same decisions (n through n+7) would need to be applied to the signal at time n+τ+3 rather than at time n+τ. Because of this, moving the correction window usually results in the receiver losing its lock on the signal until the correct values can be shifted through registers 203a-203n so that the appropriate equalized value is generated.

Figure 8:
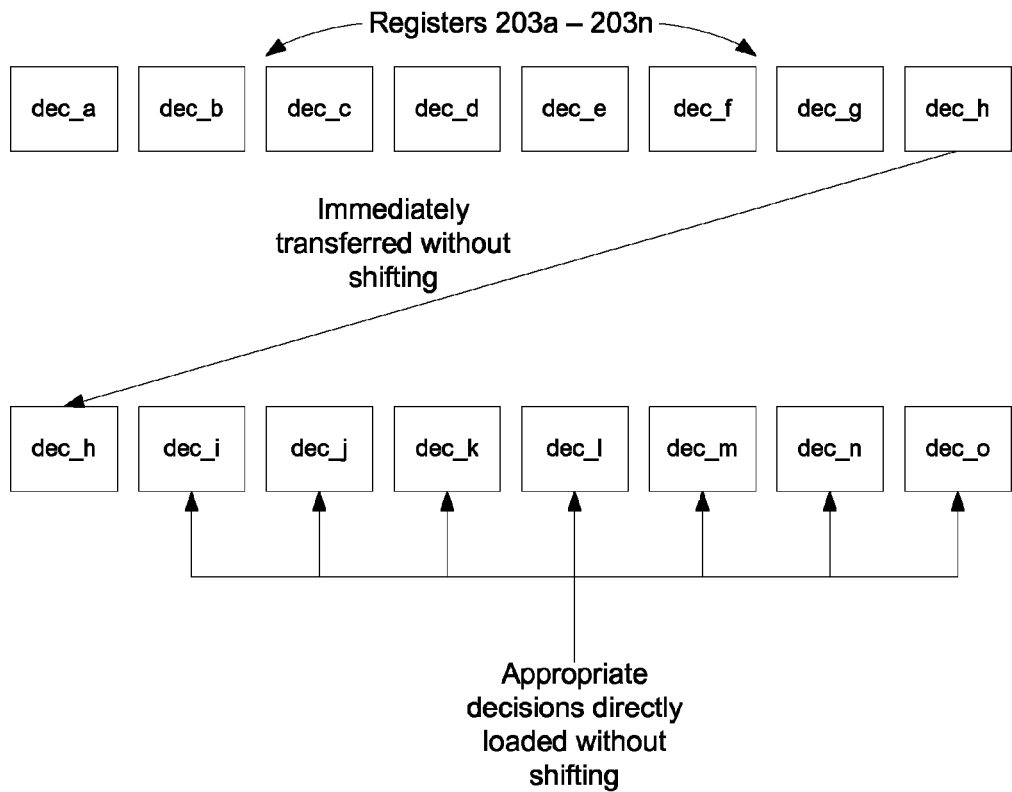
FIG. 8 illustrates the direct loading of decisions into registers of a DFE.

The present invention can be used to adjust the position of the correction window without having to discard all decisions from registers 203a-203n. FIG. 8 illustrates how this can be performed. As shown, registers 203a-203n initially contain decisions dec_a-dec_h. However, it is determined that the correction window should be adjusted such that the appropriate decisions should be dec_h-dec_o. Rather than having to wait for the appropriate decisions to be shifted into place under ordinary operating conditions (which in this case would require seven clocks), the present invention can immediately load the appropriate decisions. For example, as shown, dec_h is immediately transferred from register 203n to register 203a while dec_i-dec_o are immediately loaded into the remaining registers. This is possible because dec_i-dec_o (as well as possibly many others) can be stored in delay component 208.

A shift in the correction window can be performed at various times such as when the reflection is being received near an edge of the window. For example, if the reflection is initially being received at a time that is at the middle of the correction window, but slowly begins to be received sooner (e.g. moves to the left in FIGS. 3-5), the DFE can be configured to detect when the reflection has moved past some threshold in the window and cause the window to be adjusted as described above.

As mentioned above, the present invention can provide multiple windows. This can be accomplished by using multiple sets of decisions to generate multiple equalized values. This can be accomplished by implementing two separate sets of registers for supplying the decisions for multiplication with the taps. Of course, in embodiments where windows overlap, the decisions common to each window could be provided by a single register. Each window can be individually shifted as described above.

In some embodiments, the value of the taps can be adjusted to account for overlapping reflections. For example, when two or more reflections are received within a sufficiently close span, the interference on the received signal at a particular time can be a result of the sum of each of the two or more reflections. The combined effect of the two or more reflections can be accounted for by setting appropriate tap values rather than employing multiple windows.

Figure 9:
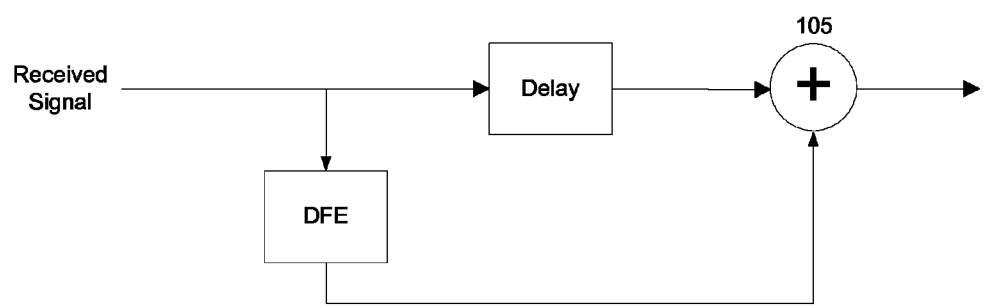
FIG. 9 illustrates an exemplary DFE that employs a delay prior to applying equalized values back to the data signal.

Further, as also mentioned above, a window can be positioned to cover the gap as is shown in FIG. 5 with window 501. This can be accomplished by sampling the received signal to generate the appropriate equalized values, but then delaying the received signal prior to applying the equalized values to the received signal as shown in FIG. 9. Even using this approach, other windows can be used at any location such as shown in FIG. 5. Delay calculator component 602 can be used to generate the appropriate delay to position each window in the correct location.

Figure 10:
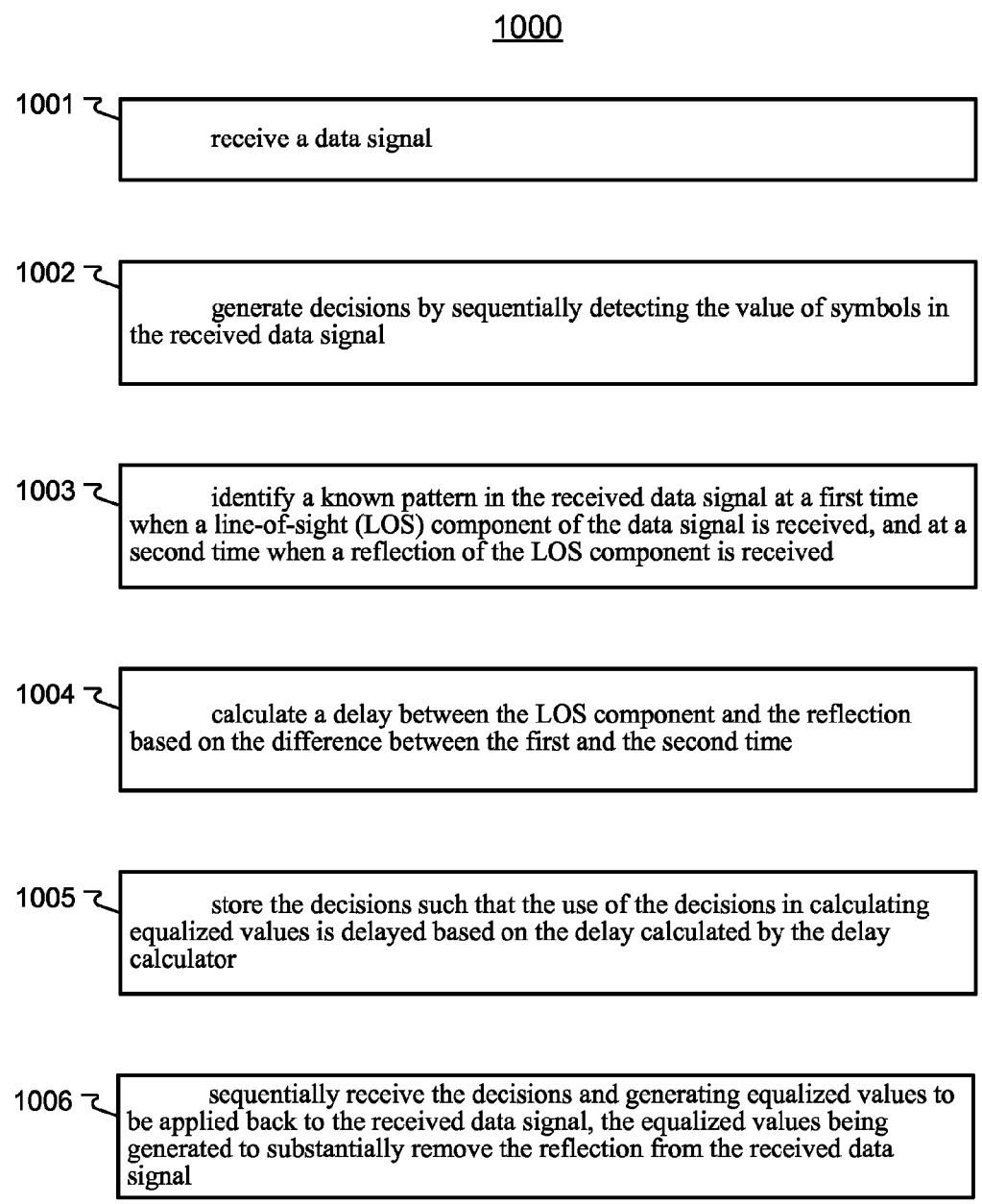
FIG. 10 illustrates a flowchart of an exemplary method for implementing a multipath delay calculator in a decision feedback equalizer.

FIG. 10 illustrates a flowchart of an exemplary method 1000 for implementing a multipath delay calculator in a decision feedback equalizer. Method 1000 will be described with reference to FIGS. 2 and 3.

Method 1000 includes an act 1001 of receiving a data signal. For example, symbol detector 201 can receive a data signal.

Method 1000 includes an act 1002 of generating decisions by sequentially detecting the value of symbols in the received data signal. For example, symbol detector 201 can sample the received data signal and generate decisions for each symbol in the data signal.

Method 1000 includes an act 1003 of identifying a known pattern in the received data signal at a first time when a line-of-sight (LOS) component of the data signal is received, and at a second time when a reflection of the LOS component is received. For example, delay calculator 206 can identify a known sequence in the data signal at time $t_{LOS}$ when the LOS signal is received and again at time $t_{REFL}$ when the reflection is received.

Method 1000 includes an act 1004 of calculating a delay between the LOS component and the reflection based on the difference between the first and the second time. For example, delay calculator 206 can calculate the difference between $t_{LOS}$ and $t_{REFL}$.

Method 1000 includes an act 1005 of storing the decisions such that the use of the decisions in calculating equalized values is delayed based on the delay calculated by the delay calculator. For example, delay component 208 can store decisions received from symbol detector 201 and delay output of the decisions to register 202a based on delay control signals 207 provided by delay calculator 206.

Method 1000 includes an act 1006 of sequentially receiving the decisions and generating equalized values to be applied back to the received data signal, the equalized values being generated to substantially remove the reflection from the received data signal. For example, decisions can be input sequentially to registers 202a-202n and multipliers 203a to produce products that are summed by summer 204 to generate the equalized values to be fed back to the received signal to substantially remove the interference caused by the reflection.

Although specific embodiments and applications of the invention have been described in this specification, these embodiments and applications are exemplary only, and many variations are possible. For example, similar multipath delay calculations can be used for the cancellation of interference.

We claim:
1. A decision feedback equalizer comprising:
   a symbol detector that generates decisions by sequentially detecting the value of symbols in a received data signal;
   a multipath delay calculator that identifies a known pattern in the received data signal at a first time when a line-of-sight (LOS) component of the data signal is received, and at a second time when a reflection of the LOS component is received, the delay calculator calculating a delay between the LOS component and the reflection based on the difference between the first and the second time;
   a delay component that stores the decisions and delays the output of the decisions based on the delay calculated by the delay calculator; and
   an equalized value generator that sequentially receives the decisions from the delay component and sequentially generates equalized values to be applied back to the received data signal, the equalized values being generated to substantially remove the reflection from the received data signal.

2. The decision feedback equalizer of claim 1, wherein the known pattern is a forward error correction sequence.

3. The decision feedback equalizer of claim 1, wherein the multipath delay calculator identifies the known pattern at a third time when another reflection of the LOS component of the data signal is received, and calculates a second delay between the LOS component and the other reflection based on the difference between the first and the third time.

4. The decision feedback equalizer of claim 3, wherein the delay component delays the output of a separate set of the decisions based on the second delay calculated by the multipath delay calculator.

5. The decision feedback equalizer of claim 1, wherein the equalized value generator generates the equalized values by summing a plurality of products of decisions and taps.

6. The decision feedback equalizer of claim 5, wherein the taps are dynamically adapted based on the delay.

7. The decision feedback equalizer of claim 1, wherein the equalized value generator comprises a sequence of registers for storing decisions and a sequence of multipliers for multiplying each decision with a corresponding tap.

8. The decision feedback equalizer of claim 7, wherein each register is configured to be loaded directly with a decision from the delay component without having the decision shifted from an adjacent register in the sequence of registers.

9. The decision feedback equalizer of claim 1, further comprising:
a signal delay component that delays the data signal after the symbol detector samples the data signal but before the equalized values are applied back to the data signal.

10. The decision feedback equalizer of claim 1, wherein the symbol detector, the multipath delay calculator, the delay component, and the equalized value generator are implemented in one of hardware, software, or a combination of hardware and software.

11. A method for implementing a multipath delay calculator in a decision feedback equalizer, the method comprising:
receiving a data signal;
generating decisions by sequentially detecting the value of symbols in the received data signal;
identifying a known pattern in the received data signal at a first time when a line-of-sight (LOS) component of the data signal is received, and at a second time when a reflection of the LOS component is received;
calculating a delay between the LOS component and the reflection based on the difference between the first and the second time;
storing the decisions such that the use of the decisions in calculating equalized values is delayed based on the delay calculated by the delay calculator; and
sequentially receiving the decisions and generating equalized values to be applied back to the received data signal, the equalized values being generated to substantially remove the reflection from the received data signal.

12. The method of claim 11, wherein identifying a known pattern comprises identifying a forward error correction sequence.

13. The method of claim 11, further comprising:
identifying the known pattern at a third time when another reflection of the LOS component of the data signal is received; and
calculating a second delay between the LOS component and the other reflection based on the difference between the first and the third time.

14. The method of claim 11, wherein the equalized values are generated by summing a plurality of products of decisions and taps.

15. The method of claim 14, wherein the taps are dynamically adapted based on the delay.

16. The method of claim 11, further comprising:
detecting a change in the delay between the LOS component and the reflection; and
updating the decisions used to calculate the equalized values by directly transferring one or more decisions from one register to another without shifting the one or more decisions from an adjacent register.

17. A system for performing equalization on a received data signal, the system comprising:
a decision feedback equalizer comprising:
a symbol detector that generates decisions by sequentially detecting the value of symbols in a received data signal;
a multipath delay calculator that identifies a known pattern in the received data signal at a first time when a line-of-sight (LOS) component of the data signal is received, and at a second time when a reflection of the LOS component is received, the delay calculator calculating a delay between the LOS component and the reflection based on the difference between the first and the second time;
a delay component that stores the decisions and delays the output of the decisions based on the delay calculated by the delay calculator; and
an equalized value generator that sequentially receives the decisions from the delay component and sequentially generates equalized values to be applied back to the received data signal, the equalized values being generated to substantially remove the reflection from the received data signal.

18. The system of claim 17, further comprising a forward filter that performs equalization on the data signal prior to the decision feedback equalizer performing equalization on the data signal.

19. The system of claim 17, wherein the known pattern is a forward error correction sequence.

20. The system of claim 17, wherein the equalized value generator comprises a sequence of registers for storing decisions and a sequence of multipliers for multiplying each decision with a corresponding tap, and wherein each register is configured to be loaded directly with a decision from the delay component without having the decision shifted from an adjacent register in the sequence of registers.

21. The decision feedback equalizer of claim 1, wherein the delay component is disposed between an output of the symbol detector and an input of the equalized value generator and delays provision of the decisions output by the symbol detector to the input of the equalized value generator by a delay period that corresponds to the delay calculated by the multipath delay calculator.

22. The method of claim 11, wherein:
the storing comprises storing the decisions for a delay period corresponding to the calculated delay, and
the sequentially receiving comprises receiving the generated decisions after the delay period following the generating of the decisions.

23. The system of claim 17, wherein the delay component is disposed between an output of the symbol detector and an input of the equalized value generator and delays provision of the decisions output by the symbol detector to the input of the equalized value generator by a delay period that corresponds to the delay calculated by the multipath delay calculator.

* * * * *